United States Patent
Haneda et al.

(10) Patent No.: US 11,209,814 B2
(45) Date of Patent: Dec. 28, 2021

(54) WORKING SYSTEM AND WORKING METHOD

(71) Applicant: HONDA MOTOR CO., LTD., Tokyo (JP)

(72) Inventors: Satoshi Haneda, Wako (JP); Makoto Yamamura, Wako (JP); Takamasa Udagawa, Wako (JP); Masato Fujiwara, Wako (JP); Satoshi Onodera, Tokyo (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 16/473,301

(22) PCT Filed: Dec. 13, 2017

(86) PCT No.: PCT/JP2017/044775
§ 371 (c)(1),
(2) Date: Jun. 25, 2019

(87) PCT Pub. No.: WO2018/123599
PCT Pub. Date: Jul. 5, 2018

(65) Prior Publication Data
US 2020/0150647 A1 May 14, 2020

(30) Foreign Application Priority Data
Dec. 27, 2016 (JP) .............................. JP2016-253720

(51) Int. Cl.
*G05D 1/00* (2006.01)
*A01D 34/00* (2006.01)
*G05D 1/02* (2020.01)
*A01D 101/00* (2006.01)

(52) U.S. Cl.
CPC ......... *G05D 1/0016* (2013.01); *A01D 34/008* (2013.01); *G05D 1/005* (2013.01);
(Continued)

(58) Field of Classification Search
CPC .... G05D 1/0016; G05D 1/0038; G05D 1/005; G05D 1/0219; G05D 2201/0208;
(Continued)

(56) References Cited

U.S. PATENT DOCUMENTS 9,104,204 B2 * 8/2015 Jones ................... G05D 1/0219
2013/0066484 A1 * 3/2013 Markusson .......... A01D 34/008
701/2

(Continued)

FOREIGN PATENT DOCUMENTS

CN       1372505 A      10/2002
JP       2003310026    * 11/2003
JP       2016-148937 A   8/2016

OTHER PUBLICATIONS

Office Action dated Jun. 28, 2021 in the corresponding Chinese Patent Application 201780079117.5, with the English translation thereof.

*Primary Examiner* — Muhammad Shafi
(74) *Attorney, Agent, or Firm* — Carrier Blackman & Associates, P.C.; William D. Blackman; Joseph P. Carrier (57) ABSTRACT

A working system (100) includes: a working actuator (26) installed on a working machine (1); a camera (21) and a microphone (22) detecting a state of a user changing in accordance with a satisfaction level; a rework determining unit (11) determining whether a rework is needed based on the detected state of the user after a predetermined work is performed by the working machine (1); and an actuator controlling unit (15) controlling the working actuator (26) to perform the rework when it is determined by the rework determining unit (11) that the rework is needed.

18 Claims, 4 Drawing Sheets

(52) U.S. Cl.
CPC ......... *G05D 1/0038* (2013.01); *G05D 1/0219* (2013.01); *A01D 2101/00* (2013.01); *G05D 2201/0208* (2013.01)

(58) Field of Classification Search
CPC .... G05D 1/02; A01D 34/008; A01D 2101/00; A01D 34/00; A01D 34/76
USPC .......................................................... 701/2
See application file for complete search history.

(56) References Cited

U.S. PATENT DOCUMENTS

| | | | |
|---|---|---|---|
| 2013/0132931 A1* | 5/2013 | Bruns | G06F 9/451 717/124 |
| 2013/0184924 A1* | 7/2013 | Jagenstedt | B60L 15/20 701/23 |
| 2014/0316634 A1* | 10/2014 | Biber | G05D 1/0219 701/23 |
| 2015/0163993 A1* | 6/2015 | Pettersson | A01D 34/008 701/28 |
| 2015/0212520 A1 | 7/2015 | Artes et al. | |
| 2016/0057925 A1* | 3/2016 | Letsky | G05D 1/0274 701/23 |
| 2016/0100521 A1* | 4/2016 | Halloran | G05D 1/0259 180/169 |
| 2016/0100522 A1* | 4/2016 | Yamauchi | A01D 34/008 701/25 |
| 2016/0174459 A1* | 6/2016 | Balutis | G05D 1/0234 701/25 |
| 2016/0227704 A1 | 8/2016 | Yamamura | |
| 2017/0020064 A1* | 1/2017 | Doughty | A01D 34/008 |

* cited by examiner

WORKING SYSTEM AND WORKING METHOD

CROSS-REFERENCE TO RELATED APPLICATION

This application is a National Stage of PCT international application Ser. No. PCT/JP2017/044775 filed on Dec. 13, 2017 which designates the United States, incorporated herein by reference, and which is based upon and claims the benefit of priority from Japanese Patent Application No. 2016-253720, filed on Dec. 27, 2016, the entire contents of which are incorporated herein by reference.

TECHNICAL FIELD

This invention relates to a working system and a working method having a working machine capable of performing a work automatically.

BACKGROUND ART

As this type of working machines, there have been known working machines that mow the lawn while autonomously traveling within a working area defined by an area wire (for example, see Patent Literature 1). The working machine described in Patent Literature 1 includes magnetic sensors that detect the strength of a magnetic field generated by a current passing through the area wire, and identifies its own position on the basis of a value detected by the magnetic sensors. Thus, the working machine works while autonomously traveling all over the working area so as not to leave any lawns unmown.

CITATION LIST

Patent Literature

Patent Literature 1: Japanese Unexamined Patent Publication No. 2016-148937

DISCLOSURE OF INVENTION

Problems to be Solved by the Invention

After a mowing job has been completed, the user may not be satisfied with the state of the working area subjected to lawn mowing by the working machine. In this case, it is necessary to instruct the working machine to perform rework. However, Patent Literature 1 above does not have any description about a method for instructing the working machine to perform rework.

Means for Solving Problem

An aspect of the present invention is a working system having a working machine configured to perform a work automatically, including: a working actuator installed on the working machine; a user state detecting unit configured to detect a state of a user changing in accordance with a satisfaction level for the work; a rework determining unit configured to determine whether a rework is needed based on the state of the user detected by the user state detecting unit after a predetermined work is performed by the working machine; and an actuator controlling unit configured to control the working actuator to perform the rework when it is determined by the rework determining unit that the rework is needed.

Another aspect of the present invention is a working method for performing a work using a working machine configured to perform the work automatically, including: detecting a state of a user changing in accordance with a satisfaction level for the work; determining whether a rework after a predetermined work performed by the working machine is needed based on the state of the user detected; and controlling a working actuator installed on the working machine to perform the rework when it is determined that the rework is needed.

Effect of the Invention

According to the present invention, it becomes possible to easily instruct the working machine to perform rework after the working machine works as necessary.

DESCRIPTION OF EMBODIMENT

Now, a working system according to an embodiment of the present invention will be described with reference to FIGS. 1 to 6. The working system of the present invention can be applied to various types of working machines. In the following, there will be described an example of application of the working system to a lawn mower that is able to mow the lawn while traveling autonomously.

Figure 1:
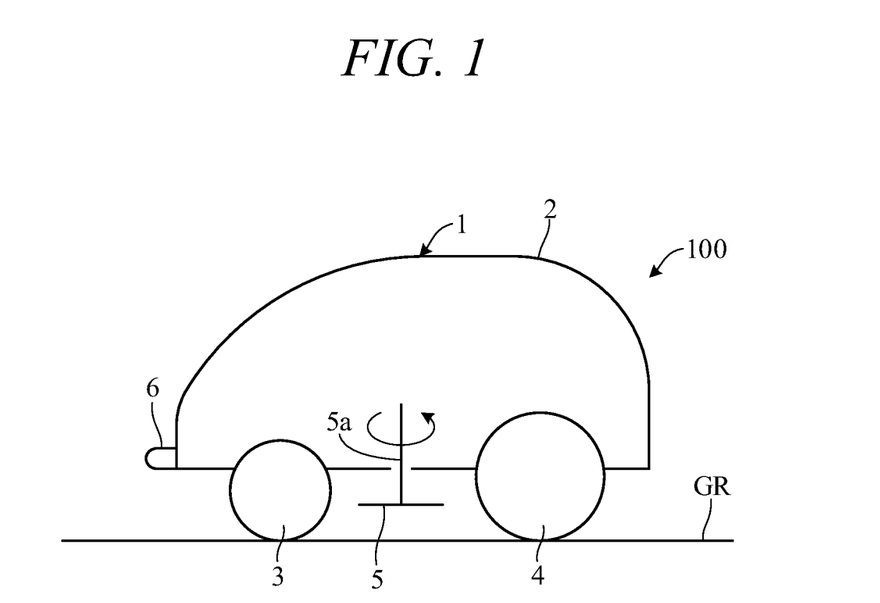
FIG. 1 is a drawing showing a schematic configuration of a working system according to an embodiment of the present invention.

FIG. 1 is a drawing showing a schematic configuration of the working system 100 according to the embodiment of the present invention, particularly, a side view showing a schematic configuration of a working machine (lawn mower) 1 configuring the working system 100. As shown in FIG. 1, the working machine 1 includes a body 2, a pair of left and right front wheels 3, and a pair of left and right rear wheels 4. The working machine 1 has a weight and size such that any user can carry it with his or her hands. In an example, the working machine 1 has an overall length of about 500 mm, an overall width of about 300 mm, and a height of about 300 mm.

A disc-shaped, lawn mowing blade 5 supported by a rotating shaft 5a protrudes toward the ground (lawn ground) GR from the bottom of the body 2. The working machine 1 is able to mow the lawn by rotating the blade 5 while traveling on the ground GR. The front end of the body 2 is provided with charging terminals 6 for charging a battery (FIG. 2A) mounted on the body 2.

Figure 2A:
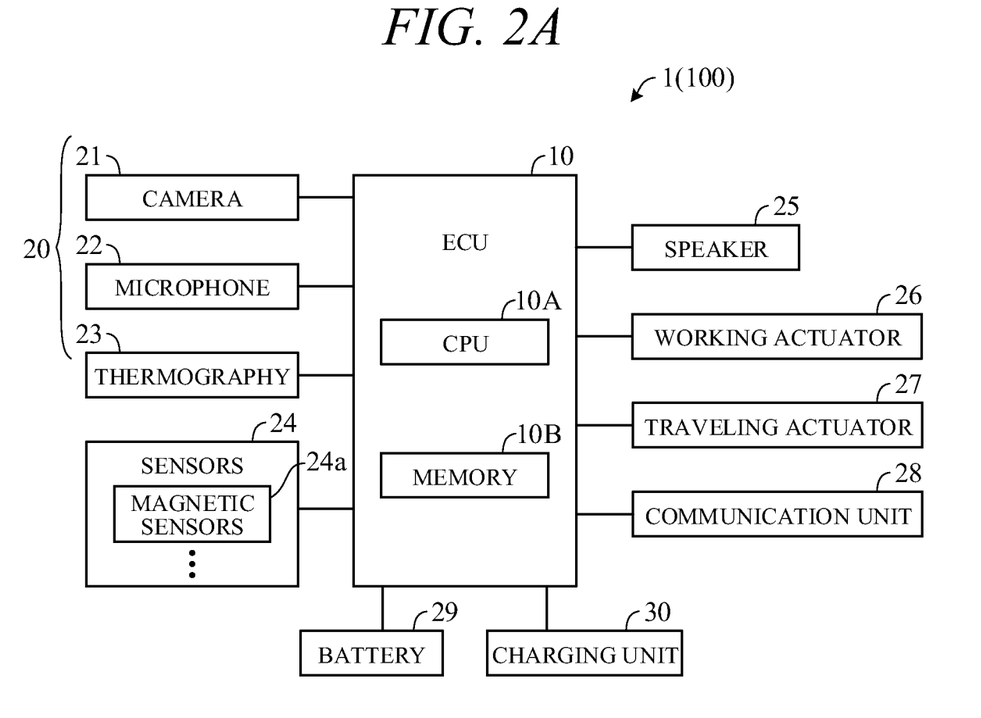
FIG. 2A is a block diagram showing a schematic configuration of the working system of FIG. 1.

FIG. 2A is a block diagram showing a schematic configuration of the working machine 1 (working system 100). As shown in FIG. 2A, the working machine 1 includes an electronic control unit (ECU) 10 and also includes a camera 21, a microphone 22, a heat or thermography sensor 23, additional sensors 24, a speaker 25, a working actuator 26, a traveling actuator 27, a communication unit 28, a battery 29, and a charging unit 30 that are connected to the ECU 10. All these components are mounted on the body 2. The ECU 10 includes a CPU (processor) 10A, a memory 10B such as ROM or RAM, other peripheral circuits, and the like.

The camera 21, microphone 22, and thermography sensor 23 form a biological information detecting unit 20 that detects biological information of users. Specifically, the camera 21 captures images of the upper-bodies of the users, including the faces, and detects the facial expressions or motions of the users; the microphone 22 acquires speeches uttered by the users, and the speeches acquired by the microphone 22 are recognized by a speech recognition unit (not shown) of the ECU 10; and the thermography sensor 23 detects the surface temperatures of the faces of the users.

The additional sensors 24 include a pair of magnetic sensors 24a spaced from each other in the vehicle width direction, and the magnetic sensors 24a detect the magnetic field strength. Although not shown, the additional sensors 24 also include a Yaw sensor that detects the angular velocity around an axis in the height direction of the working machine 1, a G sensor that detects the acceleration that acts on the working machine 1, an azimuth sensor that detects the azimuth of the working machine 1, a contact sensor that detects whether the working machine 1 has contacted an obstacle, a wheel speed sensor that detects the wheel speed of the left and right rear wheels 4, a GPS sensor that detects the position of the working machine 1, a voltage sensor that detects the remaining voltage of the battery 29, and the like. The speaker 25 outputs a speech to the users. The microphone 22 and speaker 25 allow the working machine 1 to interact with the user.

The working actuator 26 comprises an electric motor coupled to the rotating shaft 5a. The blade 5 is rotationally driven by driving the working actuator 26. The traveling actuator 27 comprises a pair of electric motors that are disposed inside the left and right rear wheels 4 in the left-right direction and independently drive the left and right rear wheels 4. The working machine 1 can be turned in any direction by making a difference in rotation speed between the left and right rear wheels 4.

The communication unit 28 includes a transmitting/receiving antenna and a signal processing circuit that processes a signal transmitted or received through the transmitting/receiving antenna. The working machine 1 is able to wirelessly communicate with external devices (e.g., a relay device or server disposed in the same site, mobile terminals carried by the users, etc.) through the communication unit 28. The battery 29 is used as a power supply for supplying power to the electric components of the working machine 1. The charging unit 30 is connected to the charging terminals 6 and battery 29 and stores power supplied from a charging station (FIG. 3) in the battery 29 through the charging terminals 6.

Figure 3:
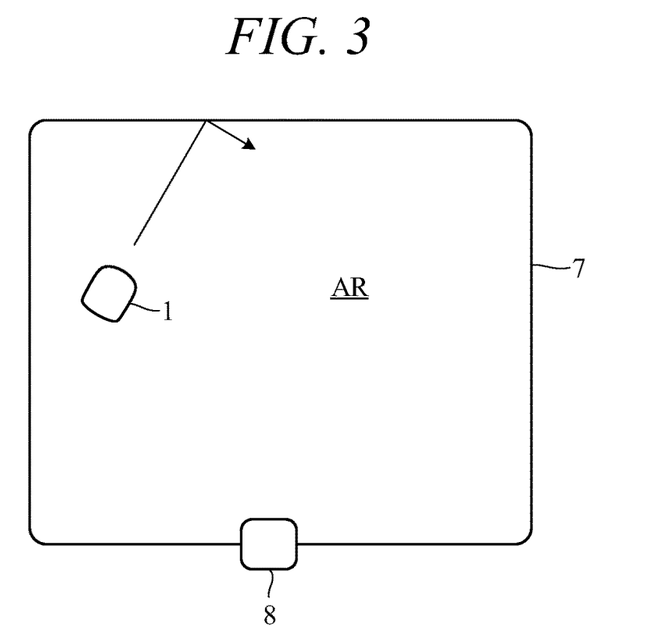
FIG. 3 is a plan view showing an example of a working area for a work by a working machine configuring the working system of FIG. 1.

The working machine 1 thus configured works while autonomously traveling within a predetermined working area. FIG. 3 is a plan view showing an example of a working area AR. The working area AR is defined by an area wire 7 previously installed in the garden (e.g., buried at a predetermined depth from the ground), and the travel range of the working machine 1 is defined by the area wire 7. A magnetic field is generated in the working area AR by passing a current through the area wire 7. The magnetic field strength of the working area AR is detected by the magnetic sensors 24a.

The magnetic field strength changes in accordance with the distance from the area wire 7. The ECU 10 (CPU 10A) determines whether the working machine 1 has reached the area wire 7, on the basis of signals from the magnetic sensors 24a. If it determines that the working machine 1 has reached the area wire 7, the ECU 10 outputs control signals to the traveling actuator 27 to turn the working machine 1 toward the inside of the working area AR, as shown by an arrow in FIG. 3. As seen above, the ECU 10 outputs control signals to the traveling actuator 27 in accordance with the signals from the magnetic sensors 24a and thus the working machine 1 autonomously travels within the working area AR. At this time, the ECU 10 outputs control signals also to the working actuator 26 and thus the working machine 1 automatically mows the lawn while traveling within the working area AR.

A charging station 8 for charging the battery 29 is disposed on the area wire 7. If the sensors 24 (e.g., a voltage sensor) detect a voltage shortage of the battery 29 while the working machine 1 works, the ECU 10 outputs control signals to the traveling actuator 27 to return the working machine 1 to the charging station 8, for example, along the area wire 7 and then charges the battery 29. When the charge of the battery 29 is complete, the ECU 10 outputs control signals to the traveling actuator 27 to cause the working machine 1 to leave the charging station 8. The ECU 10 then drives the working actuator 26 to cause the working machine 1 to restart to work.

As described above, the working area AR is set by installing the area wire 7, and the working machine 1 (ECU 10) works while recognizing the working area AR in accordance with the signals from the magnetic sensors 24a. However, the method for setting and recognizing the working area is not limited to that described above. For example, the ECU 10 may receive a beacon signal through the communication unit 28, and the working machine 1 may work in the working area while recognizing the working area using the received signal. Also, a map of the working area may be previously stored in the memory 10B of the ECU 10, and the working machine 1 may work in the working area while detecting its own position using a GPS sensor or the like. That is, the working area may be set using a working area setting unit other than the area wire 7, and the working machine may work while recognizing the working area using a position detector other than the magnetic sensors.

When the work of the work machine 1 in the working area AR is complete, the user may not be satisfied with the work result if some lawns are left unmown, or the heights of the lawns are uneven. In this case, it is necessary to instruct the work machine 1 to perform rework, or in other words, in the disclosed embodiment, to re-mow an area of the lawn that the work machine has recently finished mowing. To reduce the load on the user, it is preferred to omit the time and effort for the user to instruct the work machine 1 to perform rework by making troublesome settings and to configure the work machine 1 such that the working machine 1 automatically performs rework in accordance with the work satisfaction level of the user. In view of these points, in the present embodiment, the work machine 1 is configured as follows.

Figure 2B:
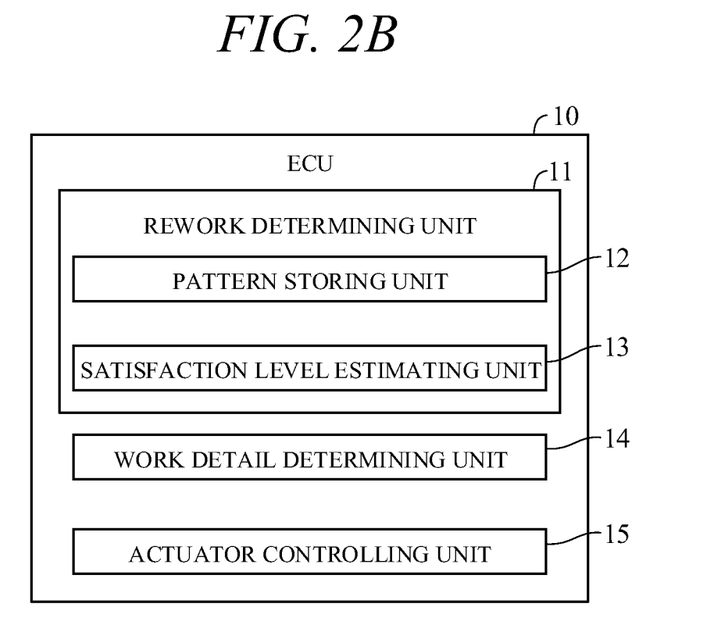
FIG. 2B is a block diagram showing a functional configuration of an ECU of FIG. 2A.

FIG. 2B is a block diagram showing the functional configuration of the ECU 10. As shown in FIG. 2B, the ECU 10 includes a rework determining unit 11, a work detail determining unit 14, and an actuator controlling unit 15. The rework determining unit 11 includes a pattern storing unit 12 and a satisfaction level estimating unit 13. Among these, the satisfaction level estimating unit 13, work detail determining unit 14, and actuator controlling unit 15 are functions performed by the CPU 10A, and the pattern storing unit 12 is a function performed by the memory 10B.

The pattern storing unit 12 previously stores data corresponding to known patterns of facial expressions, motions, speeches and facial temperature having correlations with the work satisfaction levels of the user, that is, data corresponding to the known facial expression patterns, motion patterns, speech patterns, and facial temperature patterns.

The known facial expression patterns include facial expression patterns expected to occur when the work satisfaction level is high (e.g., facial expressions of joy) and facial expression patterns expected to occur when the work satisfaction level is low (e.g., facial expressions of anger). The pattern storing unit 12 stores image data corresponding to these known facial expression patterns. Note that facial expressions of joy or anger are characterized by the angle of mouth, or look of eyes.

The known motion patterns include motion patterns expected to occur when the work satisfaction level is high (e.g., motions, such as a nod of the head and a raise of the thumb) and motion patterns expected to occur when the work satisfaction level is low (e.g., motions, such as a shake of the head and a touch of the user on the lawn with a hand). The pattern storing unit 12 stores image data corresponding to these known motion patterns.

The known speech patterns include speech patterns expected to occur when the work satisfaction level is high (e.g., speeches of "OK" and the like) and speech patterns expected to occur when the work satisfaction level is low (e.g., speeches of "try again" and the like). The pattern storing unit 12 stores speech data corresponding to these known speech patterns.

The known facial temperature patterns include facial temperature patterns expected to occur when the work satisfaction level is high (e.g., facial temperature distributions in which the average or maximum facial temperature is a predetermined temperature or lower) and facial temperature patterns expected to occur when the work satisfaction level is low (e.g., facial temperature distributions in which the average or maximum facial temperature a predetermined temperature or higher). The pattern storing unit 12 stores temperature data corresponding to these known facial temperature patterns.

The above patterns are previously given point values corresponding to the work satisfaction levels. Specifically, a pattern having a high work satisfaction level is given a point value of +1, and a pattern having a low work satisfaction level is given a point value of −1. A pattern having a higher work satisfaction level may be given a greater positive point value, and a pattern having a lower work satisfaction level may be given a smaller negative point value (with a greater absolute value). As seen above, the pattern storing unit 12 stores the multiple patterns indicating known user states corresponding to the work satisfaction levels (hereafter referred to as "work satisfaction level correspondence patterns") with the point values.

The pattern storing unit 12 also stores multiple patterns corresponding to details of rework (referred to as "work details correspondence patterns"). Specifically, the pattern storing unit 12 stores image data corresponding to motion patterns indicating areas in which rework should be performed, for example, image data corresponding to motions in which the user points a finger at a particular direction, such as a direction toward the east, west, south, or north or a forward, rear, left, or right direction, and motions indicating the entire working area. The pattern storing unit 12 also stores speech data corresponding to speech patterns indicating areas in which rework should be performed, for example, speech data corresponding to speeches indicating a particular direction, such as a direction toward the east, west, south, or north or a forward, rear, left, or right direction, and speeches indicating the entire working area, such as "do it all again". The pattern storing unit 12 also stores image data corresponding to motion patterns indicating an instruction to travel so as to automatically follow the user (e.g., a beckoning motion) and speech data corresponding to speech patterns indicating an automatic follow travel instruction (e.g., speeches of "follow me" and the like).

The satisfaction level estimating unit 13 estimates the work satisfaction level of the user about a work result obtained by performing the lawn-mowing work once, on the basis of a signal from the biological information detector 20. More specifically, the satisfaction level estimating unit 13 compares the facial expression, motion, speech and facial temperature of the user detected by the biological information detector 20 with the known patterns of the facial expression, motion, speech and facial temperature of the user (work satisfaction level correspondence patterns) stored in the pattern storing unit 12, and identifies a work satisfaction level correspondence pattern that the states of the user match. The satisfaction level estimating unit 13 then converts the work satisfaction level into a numerical value using the point values of the identified work satisfaction level correspondence pattern. If the user states match multiple work satisfaction level correspondence patterns, the satisfaction level estimating unit 13 calculates the work satisfaction level by summing up the point values of the work satisfaction level correspondence patterns.

The work satisfaction level corresponds to the emotion of the user. For this reason, the satisfaction level estimating unit 13 may estimate the work satisfaction level by estimating the emotion of the user. For example, the satisfaction level estimating unit 13 may categorize the emotions of the user into eight basic emotions (anticipation, joy, acceptance, fear, surprise, sadness, disgust, and anger) and application emotions consisting of adjacent pairs of these emotions using the wheel of emotions of Plutchik, determine an emotion in the wheel of emotions that the emotion of the user matches, on the basis of signals from the camera 21 and microphone 22, and estimate the work satisfaction level from the determined emotion.

The rework determining unit 11 determines whether rework is needed, in accordance with the work satisfaction level estimated by the satisfaction level estimating unit 13. For example, if the estimated work satisfaction level is equal to or lower than a predetermined value (for example, −1), the rework determining unit 11 determines that rework is needed.

The work detail determining unit 14 determines details of rework on the basis of a signal received from the biological information detector 20. More specifically, the work detail determining unit 14 compares the motion or speech of the user detected by the biological information detector 20 with the patterns of the motion or speech of the user (work satisfaction level correspondence patterns) stored in the pattern storing unit 12, identifies a work details correspondence pattern that the user states match, and determines the identified work details correspondence pattern as the work details of the work machine 1.

The actuator controlling unit 15 outputs control signals to the working actuator 26 and traveling actuator 27 to control the operation of the work machine 1 so that the work machine 1 mows the lawn while autonomously traveling within the working area AR. Also, once the work is complete, the actuator controlling unit 15 controls the travel operation of the work machine 1 so that the work machine 1 moves to a position in which the biological information detector 20 can detect the user states. Then, if the rework determining unit 11 determines that rework is needed, the actuator controlling unit 15 outputs control signals to the working actuator 26 and traveling actuator 27 so that the work machine 1 performs the work determined by the work detail determining unit 14. On the other hand, if the rework determining unit 11 determines that rework is not needed, the actuator controlling unit 15 controls the operation of the work machine 1 so that the work machine 1 performs a predetermined work completion operation, such as return to the charge station 8 and the start of a charge.

Figure 4:
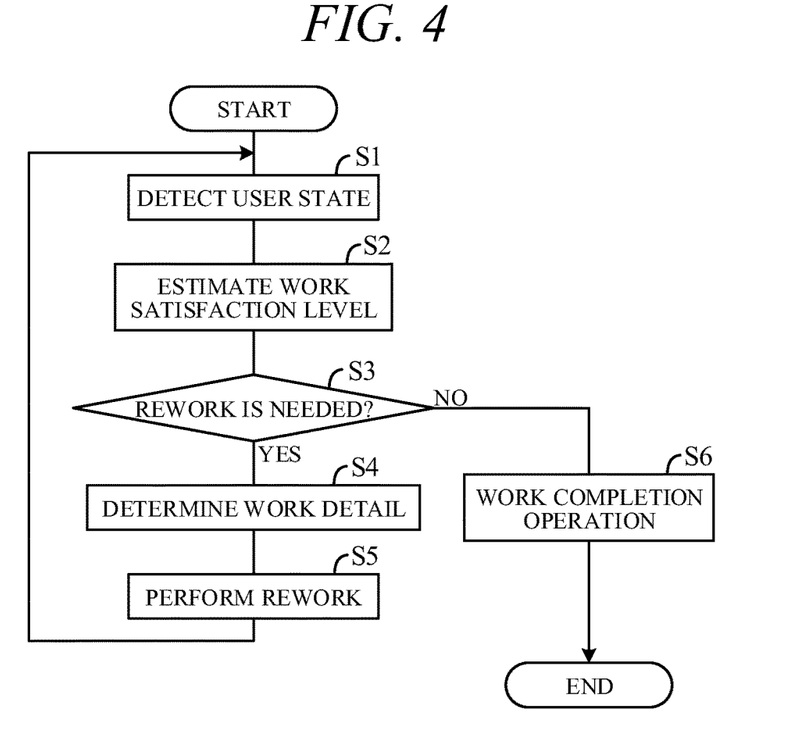
FIG. 4 is a flowchart showing an example of a process performed by a CPU of FIG. 2A.

FIG. 4 is a flowchart showing an example of a process performed by the CPU 10A in accordance with a previously stored program. The process shown in this flowchart is started, for example, after the work machine 1 performs predetermined work while autonomously traveling.

First, in step S1, the biological information detector 20 detects the states of the user, that is, the facial expression, motion, speech, and facial temperature of the user and reads detection signals thereof. Then, in step S2, the satisfaction level estimating unit 13 estimates the work satisfaction level of the user on the basis of the detection signals in step S1. Then, in step S3, the rework determining unit 11 determines whether rework is needed, that is, whether the estimated work satisfaction level is equal to or lower than the predetermined value.

If the determination in step S3 is YES, the process proceeds to step S4, and the work detail determining unit 14 determines details of the rework on the basis of the detection signals in step S1. Then, in step S5, the actuator controlling unit 15 outputs control signals to the working actuator 26 and traveling actuator 27 so that the work machine 1 performs rework corresponding to the work details determined in step S4. When the rework is completed, the process returns to step S1, and a similar process is repeated.

If it is determined in step S3 that rework is not needed, the process proceeds to step S6. In step S6, the actuator controlling unit 15 performs a predetermined work completion operation, for example, instructs the work machine 1 to return to the charge station 8, thereby ending the process.

Figure 5:
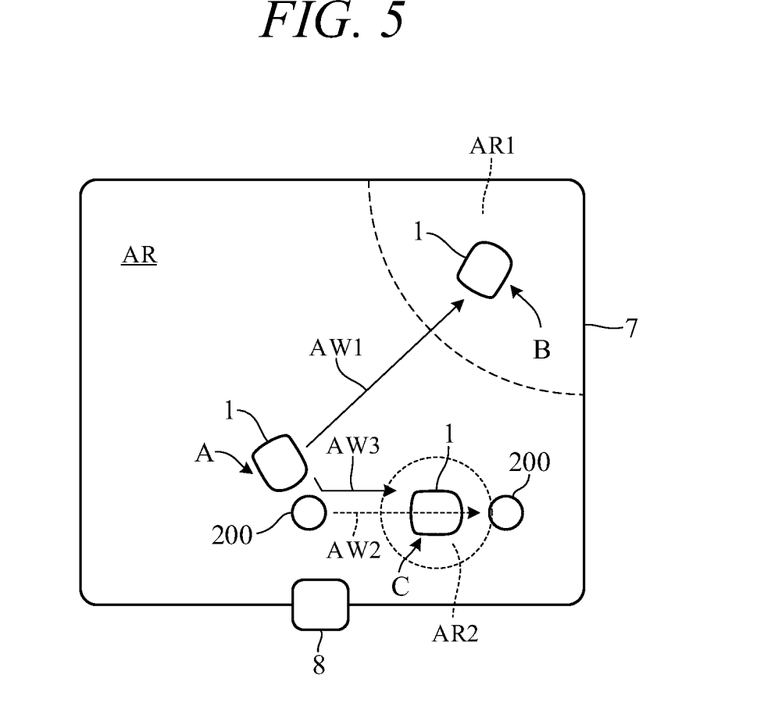
FIG. 5 is a diagram showing an example of operation of the working system according to the embodiment of the present invention.

The operation of the working system 100 according to the present embodiment will be described more specifically. FIG. 5 is a plan view showing an example of the operation of the working system 100. When the work machine 1 completes the lawn-mowing work in the working area AR, it approaches a user 200 and when the mowing machine is situated proximate the user, it detects the states of the user 200 using the biological information detector 20, such as the camera 21 and microphone 22, as shown by a portion A in FIG. 5 (step S1). Note that, alternatively, the user 200 may approach the work machine 1.

If the work satisfaction level of the user 200 becomes equal to or lower than the predetermined value due to the presence of unmown lawns, the uneven heights of the lawns, or the like, the work machine 1 determines that rework is needed and determines work details on the basis of the motion and speech of the user 200 (step S3→step S4). The work machine 1 then performs rework corresponding to the work details (step S5). For example, if the user 200 points a finger at a predetermined working area AR1 or specifies the predetermined working area AR1 with a speech, the work machine 1 moves to the working area AR1 (a portion B in FIG. 5) while autonomously traveling, as shown by an arrow AW1 in FIG. 5, and performs rework in the working area AR1.

On the other hand, if the user 200 instructs the work machine 1 to travel so as to automatically follow the user, the work machine 1 follows the movement of the user 200 shown by a dotted arrow AW2 in FIG. 5 and moves to a predetermined working area AR2 (a portion C in FIG. 5), as shown by an arrow AW3 in FIG. 5. Then, when the user 200 instructs the work machine 1 to work in the working area AR2, the work machine 1 performs rework in the working area AR2. If the user 200 instructs the work machine 1 with motion or speech to perform rework all over the working area AR, the work machine 1 performs rework all over the working area AR.

When the rework is completed, the work machine 1 detects the user states again and estimates the work satisfaction level (step S5→step S1→step S2). If the work satisfaction level is equal to or lower than the predetermined value, the work machine 1 performs rework again. If the work satisfaction level exceeds the predetermined value, the work machine 1 performs a work completion operation, thereby ending the work (step S3→step S6).

The present embodiment can produce the following advantageous effects:

(1) The working system 100 having the work machine 1 that works automatically includes the working actuator 26 disposed on the work machine 1, the biological information detector 20 (camera 21, microphone 22, and thermography sensor 23) that detects the user states that change in accordance with the work satisfaction level, the rework determining unit 11 that determines whether rework is needed, on the basis of the user states detected by the biological information detector 20 after the work machine 1 performs predetermined work (lawn mowing while traveling autonomously), and the actuator controlling unit 15 that if the rework determining unit 11 determines that rework is needed, controls the working actuator 26 so that the work machine 1 performs rework (FIGS. 2A, 2B).

As seen above, in the working system 100 according to the present embodiment, the work machine 1 itself determines whether rework is needed, on the basis of the user states detected by the biological information detector 20 after the lawn mowing is performed once, and automatically performs rework in accordance with the determination result. This eliminates the need for the user to separately perform a troublesome operation to instruct the work machine 1 to perform rework, enabling to easily instruct the work machine 1 to perform rework as necessary.

(2) The rework determining unit 11 includes the satisfaction level estimating unit 13 that estimates the work satisfaction level of the user on the basis of the user states detected by the biological information detector 20 (FIG. 2B) and, if the work satisfaction level estimated by the satisfaction level estimating unit 13 is equal to or lower than the predetermined value, determines that rework is needed. As seen above, the working system 100 is configured to perform rework in accordance with the work satisfaction level of the user. Thus, if the user is not satisfied with the work result, the working system 100 is able to cause the work machine 1 to automatically perform rework and thus to improve the work satisfaction level of the user.

(3) The working system 100 also includes the work detail determining unit 14 that determines work details on the basis of the user states detected by the biological information detector 20 (FIG. 2B). If the rework determining unit 11 determines that rework is needed, the actuator controlling unit 15 controls the working actuator 26 to perform rework corresponding to the work details determined by the work detail determining unit 14. This configuration enables to instruct the work machine 1 to perform rework, for example, only in the particular working areas AR1, AR2 of the working area AR, that is, enables the work machine 1 to efficiently perform rework.

(4) The camera 21, microphone 22, and thermography sensor 23 serving as the biological information detector 20 are disposed on the working machine 1 (FIG. 2A). Thus, the working system 100 is able to recognize the facial expression, motion, speech, and facial temperature of the user. As a result, the working system 100 is able to favorably estimate the work satisfaction level of the user and to properly determine whether rework is needed.

(5) The working system 100 also includes the traveling actuator 27 disposed on the work machine 1 (FIG. 2A). If the rework determining unit 11 determines that rework is needed, the actuator controlling unit 15 controls the working actuator 26 and traveling actuator 27 so that the work machine 1 performs rework while traveling. Since the work machine 1 is configured to be able to move as described above, the working system 100 is able to cause the work machine 1 to automatically work all over the working area.

(6) The working machine 1 configuring the working system 100 comprises a lawn mower that mows the lawn while autonomously traveling within the working area AR (FIG. 1). The work machine 1 thus configured may, for example, leave some lawns unmown, and there is a high probability that rework will be needed. For this reason, it is very useful to apply the working system 100 according to the present embodiment.

(7) A working method using the work machine 1 that automatically performs a work includes detecting the user states that change in accordance with the work satisfaction level (step S1), determining whether rework is needed after the work machine 1 performs predetermined work, on the basis of the detected user states (step S3), and if it is determined that rework is needed, controlling the working actuator 26 disposed on the work machine 1 so that the work machine 1 performs rework (step S5). This method enables to easily instruct the work machine 1 to perform rework as necessary.

Figure 6:
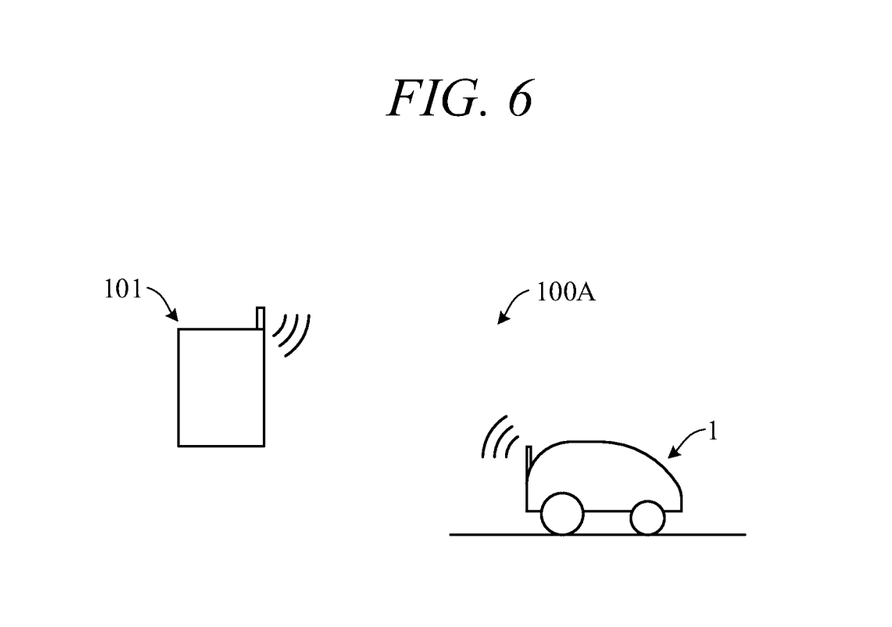
FIG. 6 is a drawing showing a modification of FIG. 1.

The above embodiment can be modified into various forms, and modifications will be described below. FIG. 6 is a diagram showing a working system 100A as a modification of FIG. 1. In FIG. 6, a work machine 1 and a server 101 are configured to be able to wirelessly communicate with each other through a communication unit. According to this configuration, the ECU 10 of the working machine 1 is able to obtain data from the server 101 as necessary. Accordingly, a part of the ECU 10 (e.g., a pattern storing unit 12) can be disposed in the server 101.

While, in the above embodiment, the camera 21 as an imaging device, the microphone 22 as a sound collector, and the thermography sensor 23 as a temperature imaging device detect the user states that change in accordance with the work satisfaction level, a user state detector is not limited to this configuration. For example, not all of the imaging device, sound collector, and temperature imaging device but at least one of these may detect the state of the user, that is, the facial expression, motion, speech, or the like of the user. The user state detector may be disposed on an entity (e.g., the wall of a building) other than the working machine.

While, in the above embodiment, the satisfaction level estimating unit 13 estimates the work satisfaction level of the user by converting the work satisfaction level into a numerical value on the basis of the user states detected by the biological information detector 20, a satisfaction level estimating unit is not limited to the above configuration and, for example, may simply estimate whether the work satisfaction level has been obtained. While, in the above embodiment, the work detail determining unit 14 determines the work details on the basis of the user states detected by the biological information detector 20, a work detail determining unit is not limited to the above configuration and, for example, may determine the work details in accordance with the work satisfaction level estimated by the work satisfaction level estimating unit.

While, in the above embodiment, the rework determining unit 11 determines whether rework is needed, on the basis of the user states detected by the camera 21, microphone 22, and the like after the work machine 1 mows the lawn, a rework determining unit is not limited to this configuration. For example, it may determine whether rework is needed, by asking the user a question of "Is rework needed?" or the like using speech output from the speaker 25 and recognizing a user response to this question as a speech. If the user is having a conversation with someone, the rework determining unit may determine whether rework is needed, from details of the conversation. Weather detection sensors, such as a sunlight sensor, a temperature/humidity sensor, and a rain sensor, may be disposed on the working machine, and the rework determining unit may determine whether rework is needed, considering information from these sensors.

Although the rework determining unit 11 determines whether rework is needed and the work machine 1 performs rework, the work satisfaction level of the user may not be improved. Such cases include a case in which a blade 5 as a working device is damaged. In this case, the work machine 1 may determine that some defect exists in itself and make contact with a dealer through the communication unit 28 to request the dealer to maintain the work machine 1. That is, the rework determining unit may determine not only whether rework is needed, but also whether a maintenance request is needed, or the like. Also, the rework determining unit may determine whether rework is needed, on the basis of whether a predetermined state of the user has been detected, regardless of the work satisfaction level. In this case, the work satisfaction level estimating unit may be omitted. Details of rework may be fixed. For example, rework may be always performed all over the working area AR. In this case, the work detail determining unit may be omitted.

While, in the above embodiment, if the rework determining unit 11 determines that rework is needed, the actuator controlling unit 15 controls the working actuator 26 and traveling actuator 27 so that the work machine 1 performs rework, an actuator controlling unit is not limited to the above configuration and, for example, may control at least the working actuator so that the work machine performs rework.

While, in the above embodiment, the moving lawn mower is used as the work machine 1, a moving working machine (e.g., a working machine used indoors) other than a lawn mower, or a fixed working machine (e.g., a sprinkler) may be used as a working machine. Accordingly, the traveling actuator and working actuator disposed on the working machine are not limited to the above configuration.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1 working machine, 11 rework determining unit, 13 satisfaction level estimating unit, 14 work detail determining unit, 15 actuator controlling unit, 20 biological information detecting unit, 21 camera, 22 microphone, 23 thermography sensor, 26 working actuator, 27 traveling actuator, 100, 100A working system

The invention claimed is:

1. A working system having a working machine configured to perform a work automatically, said working system comprising:
a working actuator installed on the working machine;
a traveling actuator installed on the working machine;
a user state detecting unit configured to detect a state of a user situated proximate the working machine, the state of the user comprising at least one of facial expressions, motions, speeches, or facial temperature of the user; and
an electronic control unit having a microprocessor and a memory, wherein the microprocessor is configured to:
control the traveling actuator to move the working machine to a position proximate the user in which the user state detecting unit can detect the state of the user after a predetermined work has been performed by the working machine;
detect a state of the user with the user state detecting unit;
determine whether a rework is needed by comparing stored patterns corresponding to known user states to the state of the user detected by the user state detecting unit; and
control the working actuator to perform the rework if it is determined that the rework is needed.

2. The working system according to claim 1, wherein the memory is configured to store patterns of facial expressions, motions, speeches, or facial temperature of the user, each of the patterns being given a point value corresponding to a satisfaction level,
and wherein the microprocessor is further configured to:
identify a pattern, from among the patterns stored in the memory, that matches the state of the user detected by the user state detecting unit;
estimate a satisfaction level of the user for the work based on the point value given to the identified pattern; and
determine that the rework is needed if the estimated satisfaction level for the work is equal to or lower than a predetermined value.

3. The working system according to claim 1, wherein the microprocessor is configured to:
determine a work detail based on the state of the user detected by the user state detecting unit, and
control the working actuator to perform the rework in accordance with the work detail if it is determined that the rework is needed.

4. The working system according to claim 1, wherein the user state detecting unit comprises at least one of an imaging device, a sound collecting device and a temperature imaging device installed on the working machine.

5. The working system according to claim 1, wherein the microprocessor is configured to control the working actuator and the traveling actuator so that the working machine performs the rework while traveling if it is determined that the rework is needed.

6. The working system according to claim 5, wherein the working machine comprises a lawn mower configured to perform a lawn-mowing work while autonomously traveling in a working area.

7. A working system having a working machine configured to perform a work automatically, said working system comprising:
a working actuator installed on the working machine;
a traveling actuator installed on the working machine;
a user state detecting unit configured to detect a state of a user situated proximate the working machine, the state of the user comprising at least one of facial expressions, motions, speeches, or facial temperature of the user; and
an electronic control unit having a microprocessor and a memory, wherein the memory is configured to store patterns of facial expressions, motions, speeches, or facial temperature of the user corresponding to known user states, each of the patterns being given a point value corresponding to a satisfaction level,
the microprocessor is configured to:
control the traveling actuator to move the machine to a position proximate the user, in which the user state detecting unit can detect the state of the user after a predetermined work has been performed by the working machine;
detect a state of the user with the user state detecting unit;
determine whether a rework is needed by comparing the stored patterns, corresponding to known user states, to the state of the user detected by the user state detecting unit; and
control the working actuator to perform the rework if it is determined that the rework is needed.

8. The working system according to claim 7, wherein the microprocessor is configured to:
identify a pattern that matches the state of the user detected by the user state detecting unit from among the patterns stored in the memory,
estimate the user's satisfaction level for the work based on the point value given to the identified pattern, and
determine that the rework is needed if the estimated satisfaction level is equal to or lower than a predetermined value.

9. The working system according to claim 7, wherein:
the microprocessor is configured to function as
a work detail determining unit configured to determine a work detail based on the state of the user detected by the user state detecting unit, and
the actuator controlling unit is configured to control the working actuator to perform the rework in accordance with the work detail determined by the work detail determining unit if it is determined by the rework determining unit that the rework is needed.

10. The working system according to claim 7, wherein the user state detecting unit comprises at least one of an imaging device, a sound collecting device and a temperature imaging device installed on the working machine.

11. The working system according to claim 7, wherein:
the microprocessor is configured to function as a traveling travelling actuator installed on the working machine, and the actuator controlling unit is configured to control the working actuator and the traveling actuator so that the working machine performs the rework while traveling if it is determined that the rework is needed.

12. The working system according to claim 11, wherein the working machine comprises a lawn mower configured to perform a lawn-mowing work while autonomously traveling in a working area.

13. A working method for performing a work using a working machine configured to perform the work automatically, comprising steps of:

controlling a traveling actuator installed on the working machine to move the machine to a position proximate a user, in which the state of the user can be detected after a predetermined work is performed by the working machine;

detecting a state of the user, the state of the user comprising at least one of facial expressions, motions, speeches, or facial temperature of the user;

determining whether a rework is needed by comparing stored patterns, corresponding to known user states, to the detected state of the user; and controlling a working actuator installed on the working machine to perform the rework if it is determined that the rework is needed.

14. The working method according to claim 13, wherein the step of determining whether the rework is needed includes:

identifying a pattern that matches a detected state of the user from among a plurality of patterns of facial expressions, motions, speeches, or facial temperature of the user stored in a computer memory, each of the patterns being given a point value corresponding to a satisfaction level;

estimating the satisfaction level for the work based on the point value given to the pattern identified; and determining that the rework is needed if the estimated satisfaction level for the work estimated is equal to or lower than a predetermined value.

15. The working method according to claim 13, further comprising determining a work detail based on the detected state of the user, and controlling the working actuator to perform the rework in accordance with the work detail determined if it is determined that the rework is needed.

16. The working method according to claim 13, wherein the detecting includes at least one of capturing an image of the user, acquiring a speech uttered by the user, and detecting a temperature of the user.

17. The working method according to claim 13, wherein the controlling includes controlling both the working actuator and the traveling actuator installed on the working machine so that the working machine performs the rework while traveling if it is determined that the rework is needed.

18. The working method according to claim 17, wherein the working machine comprises a lawn mower configured to perform a lawn-mowing work while autonomously traveling in a working area.

* * * * *